US008419930B2

(12) United States Patent
Ding

(10) Patent No.: US 8,419,930 B2
(45) Date of Patent: Apr. 16, 2013

(54) SYSTEM FOR PREPARING HIGH-QUALITY GASOLINE THROUGH COMPONENT OIL REFINING HYDROCARBON RECOMBINATION HYDROGENATION AND METHOD THEREOF

(75) Inventor: Ranfeng Ding, Beijing (CN)

(73) Assignee: Beijing Grand Golden-Bright Engineering & Technologies Co., Ltd., Beijing (CN)

( * ) Notice: Subject to any disclaimer, the term of this patent is extended or adjusted under 35 U.S.C. 154(b) by 484 days.

(21) Appl. No.: 12/918,636

(22) PCT Filed: Jan. 21, 2009

(86) PCT No.: PCT/CN2009/070238
§ 371 (c)(1),
(2), (4) Date: Aug. 20, 2010

(87) PCT Pub. No.: WO2010/083642
PCT Pub. Date: Jul. 29, 2010

(65) Prior Publication Data
US 2010/0326885 A1 Dec. 30, 2010

(51) Int. Cl.
*C10G 45/00* (2006.01)
(52) U.S. Cl.
USPC .............................................. 208/87; 208/78
(58) Field of Classification Search .............. 208/78, 208/87
See application file for complete search history.

(56) References Cited

U.S. PATENT DOCUMENTS 4,594,144 A * 6/1986 James et al. ................ 208/62
6,620,311 B2 9/2003 Morel et al. ................ 208/57

FOREIGN PATENT DOCUMENTS

| CN | 03148181.7 | 7/2003 |
| CN | 200310103540.4 | 11/2003 |
| CN | 200310103541.9 | 11/2003 |
| CN | 1621497 | 6/2005 |
| CN | 1912062 | 2/2007 |
| CN | 201144231 | 11/2008 |
| CN | 201154953 | 11/2008 |
| WO | WO 94/22980 | 10/1994 |

* cited by examiner

*Primary Examiner* — Brian McCaig
(74) *Attorney, Agent, or Firm* — J.C. Patents

(57) ABSTRACT

The invention discloses a system for preparing high-quality gasoline through component oil refining hydrocarbon recombination hydrogenation and a method thereof, which is characterized by comprising an extraction system, a distillation system and a hydrogenation device, wherein the upper part of the extraction system is connected with the distillation system through a pipeline, and the lower part of the extraction system is connected with an extract oil hydrogenation device through the pipeline; light gasoline is recovered by the upper part of the distillation system through the pipeline; the lower part of the distillation system is connected with the heavy gasoline hydrogenation device through the pipeline; and reformate or ethylene feed are recovered through the lower part of the heavy gasoline hydrogenation device through the pipeline. The system for preparing high-quality gasoline through component oil refining hydrocarbon recombination hydrogenation and the method thereof has small scale and low cost and can remove olefin, mercaptan sulphur and diene.

20 Claims, 4 Drawing Sheets

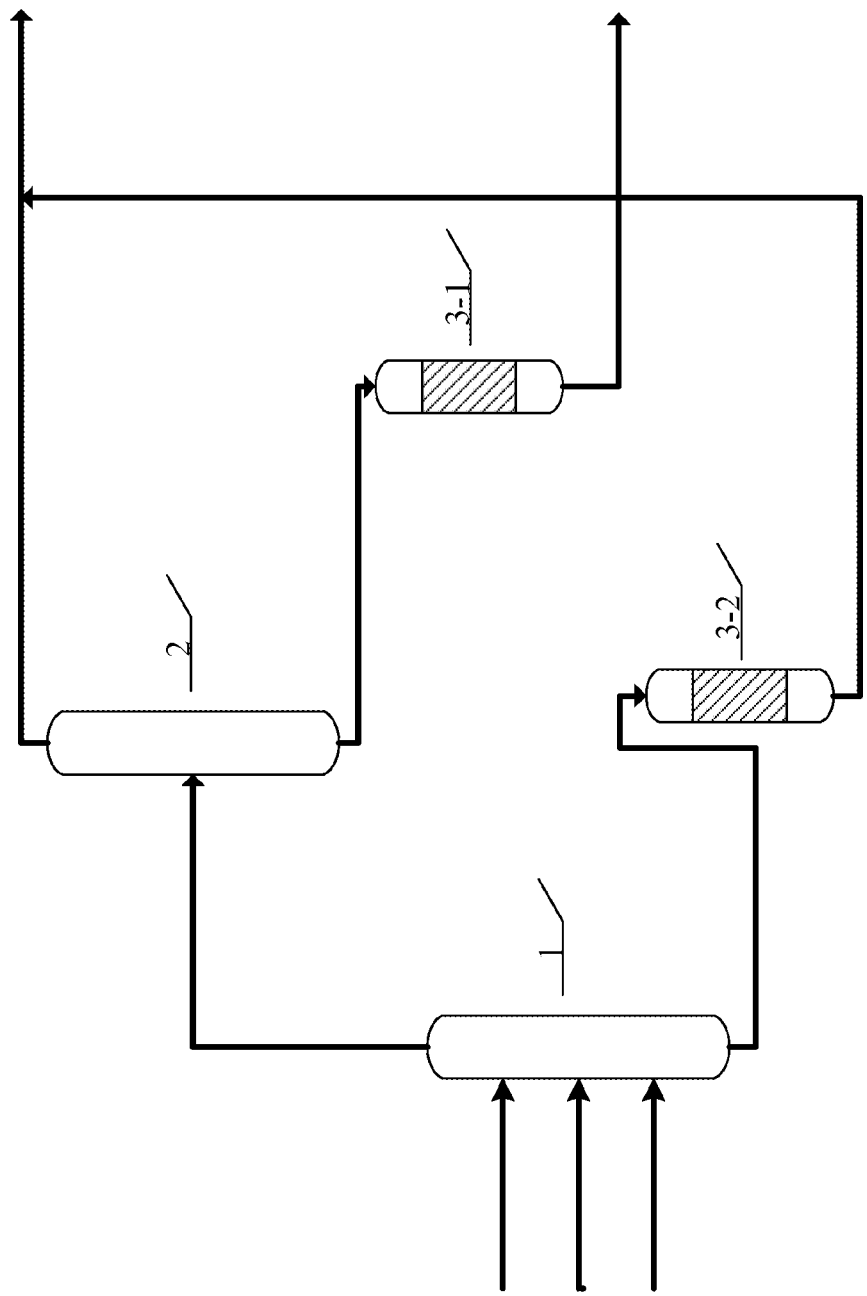

ical field.

SYSTEM FOR PREPARING HIGH-QUALITY GASOLINE THROUGH COMPONENT OIL REFINING HYDROCARBON RECOMBINATION HYDROGENATION AND METHOD THEREOF

TECHNICAL FIELD

The invention relates to a system for preparing high-quality gasoline and a method thereof, in particular to a system for preparing high-quality gasoline through component oil refining hydrocarbon recombination hydrogenation and a method thereof.

BACKGROUND ART

The catalytic cracking, catalytic pyrolysis and catalytic cracking technology is adopted as the core oil refining technology; catalytic cracking is divided into wax oil catalytic cracking and resid fluid catalytic cracking; reformate produced by the catalytic cracking technology is collectively called catalytic hydrocarbon; obtained catalytic hydrocarbon can be generally fractionated in a fractionating tower to obtain dry gas, liquefied gas, gasoline, diesel oil, heavy oil and other products, wherein the gasoline and the diesel oil accounts for above 70 percent of total gasoline and diesel oil supply amount.

Along with more and more stringent environmental requirements and increasingly improved requirements for the gasoline and the diesel oil, the prior processing method of fractionating the prior catalytic hydrocarbon in the fractionating tower has the following disadvantages that firstly, the quality of the gasoline and the diesel oil produced by adopting the processing method is required to be improved, the gasoline has higher olefin content and lower octane number (RON), the diesel oil has lower cetane number, and the invariability does not satisfy the requirements; secondly, the gasoline with different grades can not be simultaneously produced by adopting the processing method, and the varieties of products are single; and thirdly, the proportion of the produced diesel oil and the gasoline and the demand in the market are not matched, the diesel oil can not satisfy the demands, and the gasoline is beyond the requirements.

In order solve the above problems, a Chinese patent, namely a catalytic hydrocarbon recombination processing method with a Chinese patent number of 03148181.7 is provided; and the Chinese Patents with the patent numbers of 200310103541.9 and 200310103540.4 are improved, which relate to a washing system and a solvent recovery system. However, the problem of how to reduce sulphur and olefin is not related in the disclosed patents.

At present, the sulphur content, the olefin content and the benzene content respectively are not more than 0.05 percent (wt), 35 percent (v) and 2.5 percent (v) upon request of the GB 17930 Gasoline Standard; and most of refineries can satisfy the gasoline quality. However, the sulphur content, the olefin content and the benzene content respectively are not more than 0.015 percent (wt), 30 percent (v) and 1 percent (v) upon request of the State III Gasoline Standard to be executed in 2010. Most of refineries must face to the higher requirements regulated in the State IV Gasoline Standard that the sulphur content and the olefin content respectively are not more than 0.005 percent (wt) and 25 percent (v). The transition from the State III Gasoline Standard to the State IV Gasoline Standard must be considered in the gasoline quality solution, and the better planning scheme is a one-off planning scheme prepared according to the State IV Gasoline Standard.

Due to long-standing status that large proportion difference of gasoline components exists between China and developed country, catalytic cracked gasoline accounts for higher proportion, and reformate and alkylation gasoline account for smaller proportion, the problem of sulphur and olefin reduction required to be solved in the upgrade of gasoline quality mainly is mainly related to the problem of catalytic gasoline.

It is generally acknowledged that 5-10 percent of total sulphur in the catalytic cracking feedstock enters gasoline fraction. According to the characteristics of small catalytic feedstock hydrogenation refining capacity and larger secondary catalytic cracking capacity in domestic refineries as well as residuum coking, the content of sulphur contained in the catalytic gasoline produced by refineries for processing low-sulphur (with 0.3 percent of sulphur content) crude oil is about 200 ppm, the crude oil with 0.8 percent of sulphur content is processed, and the content of sulphur contained in the catalytic gasoline is 900 ppm. Therefore, the difficulty of updating gasoline quality is a problem of transition from olefin reduction to sulphur reduction. The catalytic cracked process or the improvement of catalysts can not basically solve the sulphur problem; the catalytic cracking feed hydrogen desulphurization can not be extensively applied due to large investment, high running expense, limited conditions in the refineries and can not be applicable to the refineries with lower processing capacity. Meanwhile, a catalytic cracking unit is adopted for reducing olefin in a transition manner, thereby increasing the loss of light products and gasoline octane number (RON).

The caustic washing desulphurization is not applicable to deolefination, which also can cause environmental pollution; and the energy consumption high, and the expenses also are higher through hydrotreating the light gasoline.

Therefore, the invention provides a treatment system and a method thereof, which has low cost and low energy consumption and can prepare blended gasoline with low sulphur content, low olefin content and high octane number (RON) under the condition of no pollution so as to solve the difficulties desiderated to be solved in the technical field.

CONTENTS OF THE INVENTION

One of aims of the invention is to provide a system which has low cost and low energy consumption and can prepare gasoline with low sulphur content, low olefin content and high octane number (RON) under the condition of no pollution.

In order to achieve the purpose, the invention adopts the following scheme that:

Scheme I:

A system for preparing high-quality gasoline through component oil refining hydrocarbon recombination hydrogenation and a method thereof, characterized by comprising an extraction system, a distillation system and a hydrogenation device, wherein the upper part of the extraction system is connected with the distillation system through a pipeline, and the lower part of the extraction system is connected with the hydrogenation device through the pipeline; the hydrogenation device is connected with the pipeline at the upper part of the distillation system through the pipeline; products are directly recovered by the upper part of the extraction system through the pipeline; the middle part of the distillation system is connected with another hydrogenation device through the pipeline; and products are directly recovered by the lower part of the distillation system through the pipeline.

Scheme II:

A system for preparing high-quality gasoline through component oil refining hydrocarbon recombination hydrogenation and a method thereof, characterized by comprising an extraction system, a distillation system and hydrogenation devices, wherein the upper part of the extraction system is connected with the distillation system through a pipeline, the lower part of the extraction system is connected with an extract oil hydrogenation device through the pipeline; light gasoline is directly recovered by the upper part of the distillation system through the pipeline; the lower part of the distillation system is connected with a heavy gasoline hydrogenation device through the pipeline; and catalytic reforming feedstock or ethylene cracking feed is recovered by the lower part of the heavy gasoline hydrogenation device through the pipeline.

Another aim of the invention is to provide a method for preparing high-quality gasoline.

Scheme I:

A method for preparing high-quality gasoline through component oil refining hydrocarbon recombination hydrogenation, which comprises the following steps of extracting and separating feedstock in an extraction system to extract raffinate oil and extract oil; cutting and fractionating the raffinate oil extracted by the extraction system in a distillation system, distilling light gasoline through the upper part of the distillation system and recovering the light gasoline as blended gasoline; extracting chemical light oil through a lateral line at the middle part of the distillation system; hydrotreating the chemical light oil in a chemical light oil hydrogenation device; recovering the hydrogenated chemical light oil as high-quality ethylene feed or catalytic reforming feedstock; hydrotreating the extract oil extracted by the extraction system in an extract oil hydrogenation device; recovering the hydrogenated extract oil after being mixed with the light gasoline as blended gasoline; and directly recovering diesel oil after being cut by the distillation system.

A preferred technical scheme, characterized in that the distillation system is a distillation tower with a tower top temperature of 77-95 DEG C., a tower bottom temperature of 173-194 DEG C., a tower top pressure of 0.15-0.25 MPa (absolute pressure) and a tower bottom pressure of 0.20-0.30 MPa (absolute pressure); the distillation range of light gasoline is controlled within 30-110 DEG C.; the distillation range of chemical light oil is 110-160 DEG C.; and the distillation range of diesel oil is 160-205 DEG C.

A preferred technical scheme, characterized in that the distillation system is a distillation tower with a tower top temperature of 87 DEG C., a tower bottom temperature of 184 DEG C., a tower top pressure of 0.2 MPa (absolute pressure) and a tower bottom pressure of 0.25 MPa (absolute pressure).

A preferred technical scheme, characterized in that the solvents used in the extraction system are sulfolane with an extraction temperature of 120 DEG C., a solvent ratio (solvent/feeding) of 3.5 (mass), a raffinate oil washing ratio of 0.2 (mass), a solvent recovery temperature of 165 DEG C. and a solvent recovery pressure of 0.1 MPa (absolute pressure).

A preferred technical scheme, characterized in that the solvents used in the extraction system are N-Methyl-Pyrrolidone with an extraction temperature of 130 DEG C., a solvent ratio (solvent/feeding) of 2.5 (mass), a raffinate oil washing ratio of 0.25 (mass), a solvent recovery temperature of 177 DEG C. and a solvent recovery pressure of 0.15 MPa (absolute pressure).

A preferred technical scheme, characterized in that the solvents used in the extraction system are N-formyl-morpholine with an extraction temperature of 150 DEG C., a solvent ratio (solvent/feeding) of 6 (mass), a raffinate oil washing ratio of 0.3 (mass), a solvent recovery temperature of 185 DEG C. and a solvent recovery pressure of 0.2 MPa (absolute pressure).

A preferred technical scheme, characterized in that all the catalysts in the chemical light oil hydrogenation device are hydrogenation catalysts GHT-22; and the chemical light oil hydrogenation device has a volume airspeed ratio of 1-4 $h^{-1}$, a hydrogen/oil volume ratio of 250-500, an operating temperature of 250-320 DEG C. and an operating pressure of 1-4 MPa (absolute pressure).

A preferred technical scheme, characterized in that the chemical light oil hydrogenation device has a volume airspeed ratio of 2.5 $h^{-1}$, a hydrogen/oil volume ratio of 300, an operating temperature of 285 DEG C. and an operating pressure of 2.5 MPa (absolute pressure).

A preferred technical scheme, characterized in that all the catalysts in the extract oil hydrogenation device are hydrogenation catalysts GHT-22; and the extract oil hydrogenation device has a volume airspeed ratio of 1-4 $h^{-1}$, a hydrogen/oil volume ratio of 250-500, an operating temperature of 250-290 DEG C. and an operating pressure of 1-4 MPa (absolute pressure).

A preferred technical scheme, characterized in that the extract oil hydrogenation device has a volume airspeed ratio of 2.5 $h^{-1}$, a hydrogen/oil volume ratio of 300, an operating temperature of 270 DEG C. and an operating pressure of 2.5 MPa (absolute pressure).

A preferred technical scheme, characterized in that the physical and chemical properties of all the hydrogenation catalysts GHT-22 in the chemical light oil hydrogenation device and the extract oil hydrogenation device are shown as follows:

| Names of index | Unit | GHT-22 |
|---|---|---|
| Appearance | — | Grey three-leaf shape |
| Specification | mm | Φ1.5-2.0 |
| Intensity | N/cm | 180 |
| Bulk density | g/ml | 0.73 |
| Specific surface area | $m^2/g$ | 180 |
| Pore volume | ml/g | 0.5-0.6 |
| $WO_3$ | m % | 15 |
| NiO | m % | 1.7 |
| $C_oO$ | m % | 0.15 |
| $Na_2O$ | m % | <0.09 |
| $Fe_2O_3$ | m % | <0.06 |
| $SiO_2$ | m % | <0.60 |
| Carrier | m % | 82.4 |

Scheme II:

A method for preparing high-quality gasoline through component oil refining hydrocarbon recombination hydrogenation, which comprises the following steps of extracting and separating feedstock in an extraction system to extract raffinate oil and extract oil; cutting and fractionating the raffinate oil extracted by the extraction system in a distillation system, distilling light gasoline through the upper part of the distillation system, and recovering the light gasoline as blended gasoline through the lower part of the distillation system; distilling heavy gasoline through the lower part of the distillation system, and hydrotreating the heavy gasoline in a heavy gasoline hydrogenation device; recovering the heavy gasoline after being treated by the heavy gasoline hydrogenation device as high-quality ethylene feed or catalytic reforming feedstock; hydrotreating the extract oil extracted by the extraction system in an extract oil hydrogenation device; and recovering the hydrogenated extract oil after being mixed with the light gasoline as blended gasoline.

A preferred technical scheme, characterized in that the distillation system is a distillation tower with a tower top temperature of 77-95 DEG C., a tower bottom temperature of 173-194 DEG C., a tower top pressure of 0.15-0.25 MPa (absolute pressure) and a tower bottom pressure of 0.20-0.30 MPa (absolute pressure); the distillation range of light gasoline is controlled within 30-110 DEG C.; and the distillation range of the heavy gasoline is 110-205 DEG C.

A preferred technical scheme, characterized in that the distillation tower has a tower top temperature of 87 DEG C., a tower bottom temperature of 187 DEG C., a tower top pressure of 0.20 MPa (absolute pressure) and a tower bottom pressure of 0.25 MPa (absolute pressure).

A preferred technical scheme, characterized in that the solvents used in the extraction system is sulfolane with an extraction temperature of 120 DEG C., a solvent ratio (solvent/feeding) of 3.5 (mass), a raffinate oil washing ratio of 0.2 (mass), a solvent recovery temperature of 165 DEG C. and a solvent recovery pressure of 0.1 MPa (absolute pressure).

A preferred technical scheme, characterized in that the solvents used in the extraction system is N-Methyl-Pyrrolidone with an extraction temperature of 130 DEG C., a solvent ratio (solvent/feeding) of 2.5 (mass), a raffinate oil washing ratio of 0.25 (mass), a solvent recovery temperature of 177 DEG C. and a solvent recovery pressure of 0.15 MPa (absolute pressure).

A preferred technical scheme, characterized in that the solvents used in the extraction system is N-formyl-morpholine with an extraction temperature of 150 DEG C., a solvent ratio (solvent/feeding) of 6.0 (mass), a raffinate oil washing ratio of 0.3 (mass), a solvent recovery temperature of 185 DEG C. and a solvent recovery pressure of 0.2 MPa (absolute pressure).

A preferred technical scheme, characterized in that all the catalysts in the heavy gasoline hydrogenation device and the extract oil hydrogenation device are hydrogenation catalysts GHT-22; and each hydrogenation device has a volume airspeed ratio of 1.0-4.0 $h^{-1}$, a hydrogen/oil volume ratio of 250-500, an operating temperature of 250-290 DEG C. and an operating pressure of 1.0-4.0 MPa (absolute pressure).

A preferred technical scheme, characterized in that the heavy gasoline hydrogenation device has a volume airspeed ratio of 2.5 $h^{-1}$, a hydrogen/oil volume ratio of 300, an operating temperature of 270 DEG C. and an operating pressure of 2.50 MPa (absolute pressure).

A preferred technical scheme, characterized in that the extract oil hydrogenation device has a volume airspeed ratio f 2.5 $h^{-1}$, a hydrogen/oil volume ratio of 300, an operating temperature of 285 DEG C. and an operating pressure of 2.50 MPa (absolute pressure).

A preferred technical scheme, characterized in that the physical and chemical properties of all hydrogenation catalysts GHT-22 in the chemical light oil hydrogenation and the extract oil hydrogenation device are shown as follows:

| Names of index | Unit | GHT-22 |
| --- | --- | --- |
| Appearance | — | Grey three-leaf shape |
| Specification | mm | Φ1.5-2.0 |
| Intensity | N/cm | 180 |
| Bulk density | g/ml | 0.73 |
| Specific surface area | $m^2/g$ | 180 |
| Pore volume | ml/g | 0.5-0.6 |
| $WO_3$ | m % | 15 |
| NiO | m % | 1.7 |
| $C_oO$ | m % | 0.15 |
| $Na_2O$ | m % | <0.09 |
| $Fe_2O_3$ | m % | <0.06 |
| $SiO_2$ | m % | <0.60 |
| Carrier | m % | 82.4 |

The solvents used in the invention also can be other solvents or mixed two or more than two solvents in these solvents by arbitrary proportion.

The naphtha, the stabilized gasoline and the hydrotreated coker gasoline in the invention can be mixed by arbitrary proportion.

The cut points (distillation range) of the light gasoline, the chemical light oil and the diesel oil in the invention can be adjusted. If the distillation range of the light gasoline is controlled within 30-70 DEG C., the distillation ranges of the chemical light oil and the diesel oil respectively are 70-160 DEG C. and 160-205 DEG C.; and if the distillation range of the light gasoline is controlled within 30-90 DEG C., the distillation ranges of the chemical light oil and the diesel oil respectively are 90-160 DEG C. and 160-205 DEG C.

The distillation system (distillation tower) used in the invention is a distillation system disclosed in a Chinese patent with a patent numbers of 03148181.7, namely catalytic hydrocarbon recombination treatment method. The used extraction system (extraction tower) is an extraction system disclosed in a Chinese patent with patent numbers of 200310103541.9 and 200310103540.4, which comprises a solvent recovery system and a washing system.

The hydrogenation device used in the invention is the prior hydrogenation device, which comprises a heating furnace, a heat exchanger, a high-pressure separator, an air condenser, a water condenser and the like.

The invention is further described as follows through attached drawings and specific implementation manner, but it does not mean that the protection scope of the invention is limited.

DESCRIPTION OF THE DRAWINGS

FIG. 4 is a flow diagram of embodiments 5 and 6.

SPECIFIC IMPLEMENTATION MANNER

Embodiment 1

Figure 1:
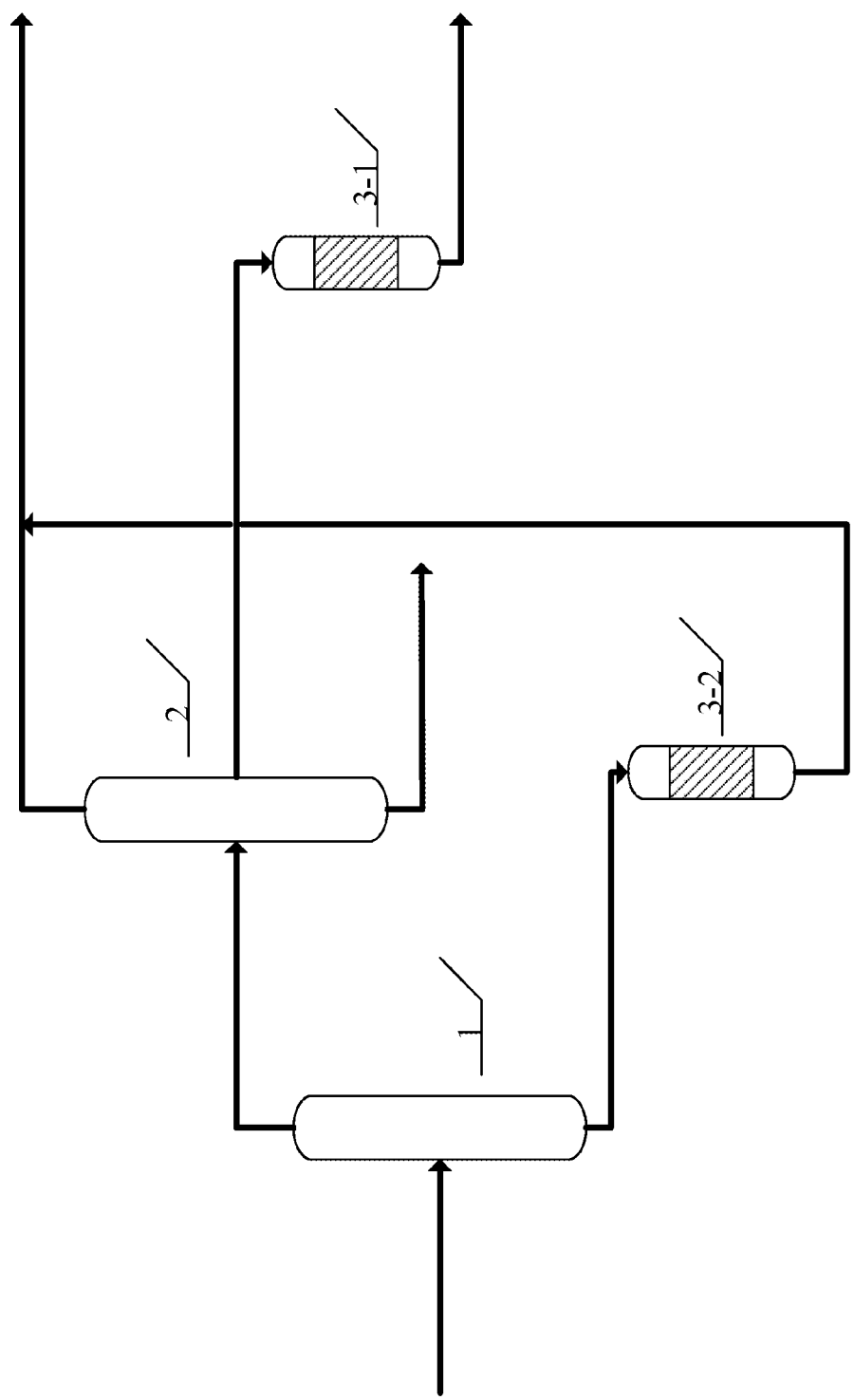
FIG. 1 is a flow diagram of embodiment 1.

FIG. 1 is the flow diagram of embodiment 1, which comprises the following steps of extracting and separating stabilized gasoline (catalytic gasoline) with a distillation range of 35-205 DEG C., a sulphur content of 100 ppm, a mercaptan sulphur content of 5 ppm, an olefine content of 30 percent (v), an alkadiene content of 0.1 percent (v), an aromatic hydrocarbon content of 15 percent (v), an octane number (RON) of 89 and a density of 728 kilograms/$m^3$ in an extraction tower 1 by the flow capacity of 60,000 tons/annual to extract extract oil and raffinate oil; ensuring that the solvents used in the extraction tower 1 are sulfolane with an extraction temperature of 120 DEG C., a solvent ratio (solvent/feeding) of 3.5 (mass), a raffinate oil washing ratio of 0.2 (mass), a solvent recovery temperature of 165 DEG C. and a solvent recovery pressure of 0.1 MPa (absolute pressure); cutting and fractionating raffinate oil extracted by the upper part of the extraction tower 1 in a distillation tower 2 by the flow capacity of 48,000 tons/annual to respectively obtain light gasoline, chemical light oil and diesel oil, wherein the distillation tower 2 has a tower top temperature of 77 DEG C., a tower bottom temperature of 173 DEG C., a tower top pressure of 0.15 MPa (absolute pressure) and a tower bottom pressure of 0.20 MPa (absolute pressure); distilling the light oil with a distillation range of 30-110 DEG C. through the upper part of the distillation tower 2 and recovering the light oil as blended gasoline by the flow capacity of 19,500 tons/annual; extracting the chemical light oil with a distillation range of 110-160 DEG C. through a lateral line of the distillation tower 2, wherein the distillation tower 2 has a total distillation amount of 22,500 tons/annual; hydrotreating the chemical light oil in a hydrogenation device 3-1 by the flow capacity of 22,500 tons/annual, wherein the catalysts in the hydrogenation device 3-1 are hydrogenation catalysts GHT-22, and the hydrogenation device 3-1 has a volume airspeed ratio of 4 h$^{-1}$, a hydrogen/oil volume ratio of 500, an operating temperature of 320 DEG C. and an operating pressure of 4 MPa (absolute pressure); recovering the hydrogenated chemical light oil as high-quality ethylene feed or catalytic reforming feedstock by the flow capacity of 22,500 tons/annual; hydrotreating extract oil extracted by the lower part of the extraction tower 1 in a hydrogenation device 3-2 by the flow capacity of 12,000 tons/annual, wherein the catalysts in the hydrogenation device 3-2 are hydrogenation catalysts GHT-22, the hydrogenation device 3-2 has a volume airspeed ratio of 4 h$^{-1}$, a hydrogen/oil volume ratio of 500, an operating temperature of 290 DEG C. and an operating pressure of 4 MPa (absolute pressure); recovering the hydrogenated extract oil after being mixed with the light gasoline as blended gasoline by the flow capacity of 12,000 tons/annual; and directly recovering the diesel oil with a distillation range of 160-205 DEG C. after being cut by the distillation tower 2 as diesel oil products by the flow capacity of 6,000 tons/annul.

The obtained blended gasoline has a distillation of 30-205 DEG C., a sulphur content of 3.1 ppm, a mercaptan sulphur content of 1.0 ppm ((The trace contained is capable of being detected), an olefine content of 24.1 percent (v), an alkadiene content of 0.05 percent (v), an aromatic hydrocarbon content of 26.7 percent (v), an octane number (RON) of 95.3, a density of 727.6 kilograms/m$^3$ and an overall recovery of 31,500 tons/annual.

The obtained high-quality ethylene feed or the catalytic reforming feedstock has a distillation range of 110-160 DEG C., a trace contained in the sulphur content incapable of being detected, a mercaptan sulphur content of 1.0 ppm (The trace contained is capable of being detected), a trace contained in the olefin content incapable of being detected, a bromine index (bromine number) of 39 (0.039), an aromatic hydrocarbon content of 1.3 percent (v), ne number (RON) of 83.0, a density of 729.0 kilograms/m$^3$ and an overall recovery of 22,500 tons/annual.

The obtained diesel oil has a distillation range of 160-205 DEG C., a sulphur content of 26.3 ppm, a mercaptan sulphur content of 1.55 ppm, an olefin content of 27.8 percent (v), an alkadiene content of 0.04 percent (v), an aromatic hydrocarbon content of 5.6 percent (v), a cetane number of 45.8, a density of 751.7 kilograms/m$^3$ and an overall amount of 6000 tons/annual.

The physical and chemical properties of all the hydrogenation catalysts GHT-22 in the hydrogenation device are shown as follows:

| Names of index | Unit | GHT-22 |
| --- | --- | --- |
| Appearance | — | Grey three-leaf shape |
| Specification | mm | Φ1.5-2.0 |
| Intensity | N/cm | 180 |
| Bulk density | g/ml | 0.73 |
| Specific surface area | m$^2$/g | 180 |
| Pore volume | ml/g | 0.5-0.6 |
| WO$_3$ | m % | 15 |
| NiO | m % | 1.7 |
| C$_o$O | m % | 0.15 |
| Na$_2$O | m % | <0.09 |
| Fe$_2$O$_3$ | m % | <0.06 |
| SiO$_2$ | m % | <0.60 |
| Carrier | m % | 82.4 |

The measuring methods used in the invention are shown as follows (the same below):

1. Distillation range: GB/T6536-1997 Petroleum Products-Determination of Distillation;
2. Sulphur content: SH/T0689-2000 Standard Test Method for Determination of Total Sulphur in Light Hydrocarbons, Motor Fuels and Oils (Ultraviolet Fluorescence);
3. Mercaptan Sulphur: GB/T1792-1988 Distillate Fuels-Determination of Mercaptan Sulphur (Potentiometric Titration Method);
4. Olefin: GB/T11132-2002 Standard Test Method for Hydrocarbon Types in Liquid Petroleum Products (Fluorescent Indicator Adsorption Method);
5. Aromatic Hydrocarbon: GB/T11132-2002 Standard Test Method for Hydrocarbon Types in Liquid Petroleum Products (Fluorescent Indicator Adsorption Method);
6. Octane Number: GB/T5487 Test method for motor gasoline octane Number (Research Method);
7. Density: GB/T1884-2000 Crude Petroleum and Liquid Petroleum Products-Laboratory Determination of Density—Hydrometer Method;
8. Measurement of Diene (Alkadiene): Titering process
9. Hydrogenation catalyst analytical method:

| Chemical compound | Analytical method | Adopted petrochemical industry |
| --- | --- | --- |
| NiO | Colorimetric method | SH/T0346-1992 |
| C$_o$O | Colorimetric method | SH/T0345-1992 |
| WO$_3$ | Colorimetric method | |
| Physical properties | Analytical method | Used instrument |
| Superficial area | Low-temperature nitrogen adsorption method | 2400 adsorption instrument |
| Pore volume | Mercury intrusion method | Auto Pore II 9200 |
| Intensity | Anti-crush strength determining method | DL II intelligent particle intensity determining instrument |
| Bulk density | Weighing method | |

10. Bromine index detection: GB/T 11136-1989

Embodiment 2

Figure 2:
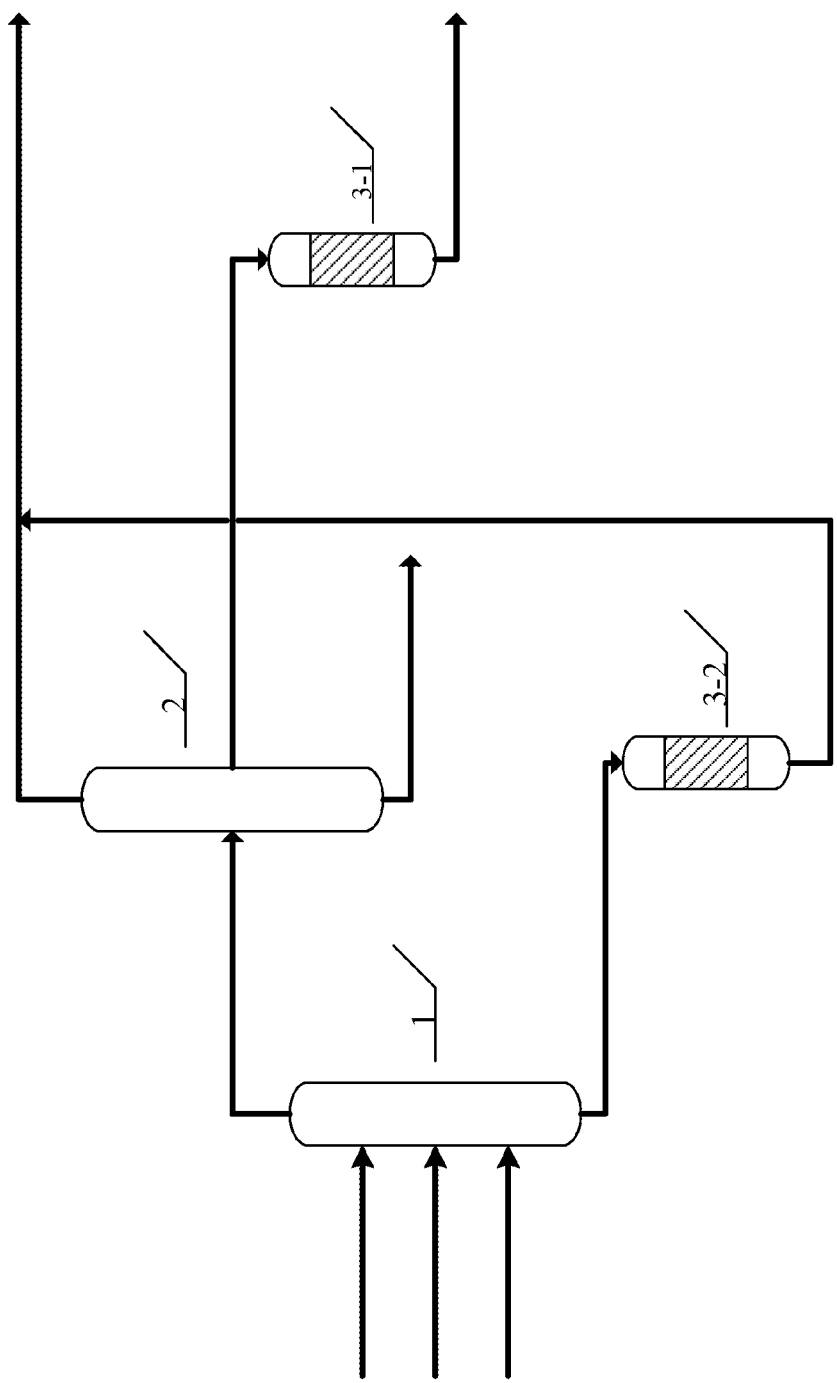
FIG. 2 is a flow diagram of embodiments 2 and 3.

FIG. 2 is the flow diagram of embodiment 2, which comprises the following steps of extracting and separating stabilized gasoline (catalytic gasoline) with a distillation range of 35-205 DEG C., a sulphur content of 100 ppm, a mercaptan sulphur content of 5 ppm, an olefine content of 30 percent (v), an alkadiene content of 0.1 percent (v), an aromatic hydrocarbon content of 15 percent (v), an octane number (RON) of 89 and a density of 728 kilograms/m$^3$ in an extraction tower 1 by the flow capacity of 60,000 tons/annual; simultaneously extracting and separating naphtha with a distillation range of 30-205 DEG C., a sulphur content of 200 ppm, a mercaptan sulphur content of 1 ppm, an olefine content of lower than 0.1 percent (v) (The trace contained is capable of being detected), an alkadiene content of lower than 0.1 percent (v) (The trace contained is capable of being detected), an aromatic hydrocarbon content of 8 percent (v), an octane number (RON) of 82 and a density of 732 kilograms/m$^3$ in the extraction tower 1 by the flow capacity of 20,000 tons/annual; meanwhile, extracting and separating hydrotreated coker gasoline with a distillation range of 30-205 DEG C., a sulphur content of 150 ppm, a mercaptan sulphur content of 1 ppm, an olefine content of lower than 6 percent (v), an alkadiene content of lower than 0.01 percent (v) (The trace contained is capable of being detected), an aromatic hydrocarbon content of 10 percent (v), an octane number (RON) of 79 and a density of 721 kilograms/m$^3$ in the extraction tower 1 by the flow capacity of 20,000 tons/annual; extracting and separating three feedstock after being mixed in the extraction tower 1 to extract extract oil and raffinate oil; ensuring that the solvents used in the extraction tower 1 are N-Methyl-Pyrrolidone with an extraction temperature of 130 DEG C., a solvent ratio (solvent/feeding) of 2.5 (mass), a raffinate oil washing ratio of 0.25 (mass), a solvent recovery temperature of 177 DEG C. and a solvent recovery pressure of 0.15 MPa (absolute pressure); cutting and fractionating the raffinate oil extracted by the extraction tower 1 in a distillation tower 2 by the flow capacity of 84,000 tons/annual to respectively obtain light gasoline, chemical light oil and diesel oil, wherein the distillation tower 2 has a tower top temperature of 87 DEG C., a tower bottom temperature of 184 DEG C., a tower top pressure of 0.2 MPa (absolute pressure) and a tower bottom pressure of 0.25 MPa (absolute pressure); distilling the light oil with a distillation range of 30-110 DEG C. through the upper part of the distillation tower 2 and recovering the light oil as blended gasoline by the flow capacity of 33,000 tons/annual; extracting the chemical light oil with a distillation range of 110-160 DEG C. through a lateral line of the distillation tower 2, wherein the distillation tower 2 has a total distillation amount of 41,000 tons/annual; hydrotreating the chemical light oil in a hydrogenation device 3-1 by the flow capacity of 41,000 tons/annual, wherein the catalysts in the hydrogenation device 3-1 are hydrogenation catalysts GHT-22, and the hydrogenation device 3-1 has a volume airspeed ratio of 1.0 h$^{-1}$, a hydrogen/oil volume ratio of 250, an operating temperature of 250 DEG C. and an operating pressure of 1.0 MPa (absolute pressure); recovering the chemical light oil as high-quality ethylene feed or catalytic reforming feedstock by the flow capacity of 41,000 tons/annual; hydrotreating the extract oil extracted by the extraction tower 1 in a hydrogenation device 3-2 by the flow capacity of 16,000 tons/annual, wherein the catalysts in the hydrogenation device 3-2 are hydrogenation catalysts GHT-22, the hydrogenation device 3-2 has a volume airspeed ratio of 1.0 h$^{-1}$, a hydrogen/oil volume ratio of 250, an operating temperature of 250 DEG C. and an operating pressure of 1.0 MPa (absolute pressure); recovering the hydrogenated extract oil after being mixed with the light gasoline as blended gasoline by the flow capacity of 16,000 tons/annual; and directly recovering the diesel oil with a distillation range of 160-205 DEG C. after being cut by the distillation tower 2 as diesel oil products by the flow capacity of 10,000 tons/annul.

The obtained blended gasoline has a distillation of 30-205 DEG C., a sulphur content of 3.4 ppm, a mercaptan sulphur content of 1.0 ppm ((The trace contained is capable of being detected), an olefine content of 16.6 percent (v), an alkadiene content of 0.05 percent (v), an aromatic hydrocarbon content of 23.7 percent (v), an octane number (RON) of 95.0, a density of 719.2 kilograms/m$^3$ and an overall recovery of 49,000 tons/annual.

The obtained high-quality ethylene feed or catalytic reforming feedstock has a distillation range of 110-160 DEG C., a trace contained in the sulphur content incapable of being detected, a mercaptan sulphur content of 1.0 ppm (The trace contained is capable of being detected), a trace contained in the olefine content incapable of being detected, a bromine index (bromine number) of 32 (0.032), an aromatic hydrocarbon content of 1.3% (v), an octane number (RON) of 76.2, a density of 731.0 kilograms/m$^3$ and an overall recovery of 41,000 tons/annual.

The obtained diesel oil has a distillation range of 160-205 DEG C., a sulphur content of 46.5 ppm, a mercaptan sulphur content of 0.17 ppm (The trace contained is capable of being detected), an olefin content of 15.0 percent (v), an alkadiene content of 0.04 percent (v), an aromatic hydrocarbon content of 3.6 percent (v), a cetane number of 45.5, a density of 753.9 kilograms/m$^3$ and an overall amount of 10,000 tons/annual.

The physical and chemical properties of all the hydrogenation catalysts GHT-22 contained in the hydrogenation device and the used test method thereof are the same as the embodiment 1.

Embodiment 3

The flow is the same as the embodiment 2, which comprises the following steps of extracting and separating stabilized gasoline (catalytic gasoline) with a distillation range of 30-205 DEG C., a sulphur content of 800 ppm, a mercaptan sulphur content of 9 ppm, an olefine content of 36 percent (v), an alkadiene content of 0.9 percent (v), an aromatic hydrocarbon content of 17 percent (v), an octane number (RON) of 91 and a density of 731 kilograms/m$^3$ in an extraction tower 1 by the flow capacity of 60,000 tons/annual; simultaneously extracting and separating naphtha with a distillation range of 30-205 DEG C., a sulphur content of 200 ppm, a mercaptan sulphur content of 1 ppm, an olefine content of lower than 0.1 percent (v) (The trace contained is capable of being detected), an alkadiene content of lower than 0.01 percent (v) (The trace contained is capable of being detected), an aromatic hydrocarbon content of 8 percent (v), an octane number (RON) of 82 and a density of 732 kilograms/m$^3$ in the extraction tower 1 by the flow capacity of 20,000 tons/annual; meanwhile, extracting and separating hydrotreated coker gasoline with a distillation range of 30-205 DEG C., a sulphur content of 150 ppm, a mercaptan sulphur content of 1 ppm, an olefine content of 6 percent (v), an alkadiene content of lower than 0.01 percent (v) (The trace contained is capable of being detected), an aromatic hydrocarbon content of 10 percent (v), an octane number (RON) of 79 and a density of 721 kilograms/m$^3$ in the extraction tower 1 by the flow capacity of 20,000 tons/annual; extracting and separating three feedstock after being mixed in the extraction tower 1 to extract extract oil and raffinate oil; ensuring that the solvents used in the extraction tower 1 are N-formyl-morpholine with an extraction temperature of 150 DEG C., a solvent ratio (solvent/feeding) of 6.0 (mass), a raffinate oil washing ratio of 0.3 (mass), a solvent recovery temperature of 185 DEG C. and a solvent recovery pressure of 0.2 MPa (absolute pressure); cutting and fractionating the raffinate oil extracted by the upper part of the extraction tower 1 in a distillation tower 2 by the flow capacity of 82,000 tons/annual to respectively obtain light gasoline, chemical light oil and diesel oil, wherein the distillation tower 2 has a tower top temperature of 95 DEG C., a tower bottom temperature of 194 DEG C., a tower top pressure of 0.25 MPa (absolute pressure) and a tower bottom pressure of 0.30 MPa (absolute pressure); distilling the light oil with a distillation range of 30-110 DEG C. through the upper part of the distillation tower 2 and recovering the light oil as blended gasoline by the flow capacity of 33,000 tons/annual; extracting the chemical light oil with a distillation range of 110-160 DEG C. through a lateral line of the distillation tower 2, wherein the distillation tower 2 has a total distillation amount of 41,000 tons/annual; hydrotreating the chemical light oil in a hydrogenation device 3-1 by the flow capacity of 41,000 tons/annual, wherein the catalysts in the hydrogenation device 3-1 are hydrogenation catalysts GHT-22, and the hydrogenation device 3-1 has a volume airspeed ratio of 2.5 $h^{-1}$, a hydrogen/oil volume ratio of 300, an operating temperature of 285 DEG C. and an operating pressure of 2.5 MPa (absolute pressure); recovering the hydrogenated chemical light oil as high-quality ethylene feed or catalytic reforming feedstock by the flow capacity of 41,000 tons/annual; hydrotreating the extract oil extracted by the extraction tower 1 in a hydrogenation device 3-2 by the flow capacity of 18,000 tons/annual, wherein the catalysts in the hydrogenation device 3-2 are hydrogenation catalysts GHT-22, and the hydrogenation device 3-2 has a volume airspeed ratio of 2.5 $h^{-1}$, a hydrogen/oil volume ratio of 300, an operating temperature of 270 DEG C. and an operating pressure of 2.5 MPa (absolute pressure); recovering the hydrogenated extract oil after being mixed with the light gasoline as blended gasoline by the flow capacity of 18,000 tons/annual; and directly recovering the diesel oil with a distillation range of 160-205 DEG C. after being cut by the distillation tower 2 as diesel oil products by the flow capacity of 8,000 tons/annul.

The obtained blended gasoline has a distillation range of 30-205 DEG C., a sulphur content of 3.2 ppm, a mercaptan sulphur content of lower than 1.0 ppm (The trace contained is capable of being detected), an olefine content of 19.5 percent (v), an alkadiene content of 0.05 percent (v), an aromatic hydrocarbon content of 25.0 percent (v), an octane number (RON) of 94.7, a density of 723.3 kilograms/$m^3$, an overall recovery of 51,000 tons/annual.

The obtained high-quality ethylene feed or reformate has a distillation of 110-160 DEG C., a trace contained in the sulphur content incapable of being detected, a mercaptan sulphur content of lower than 1.0 ppm (The trace contained is capable of being detected), a trace contained in the olefine content incapable of being detected, a bromine index (bromine number) of 25 (0.025), an aromatic hydrocarbon content of 1.3 percent (v), an octane number (RON) of 77.6, a density of 731.0 kilograms/$m^3$, an overall recovery of 41,000 tons/annual.

The obtained diesel oil has a distillation of 160-205 DEG C., a sulphur content of 478.1 ppm, a mercaptan sulphur content of 2.61 ppm, an olefine content of 17.8 percent (v), an alkadiene content of 0.04 percent (v), an aromatic hydrocarbon content of 5.6 percent (v), a cetane number of 45.1, a density of 759.1 kilograms/$m^3$ and an overall recovery of 8,000 tons/annual.

The all the hydrogenation catalysts GHT-22 contained in the hydrogenation devices and the used test method thereof are the same as the embodiment 1

Embodiment 4

Figure 3:
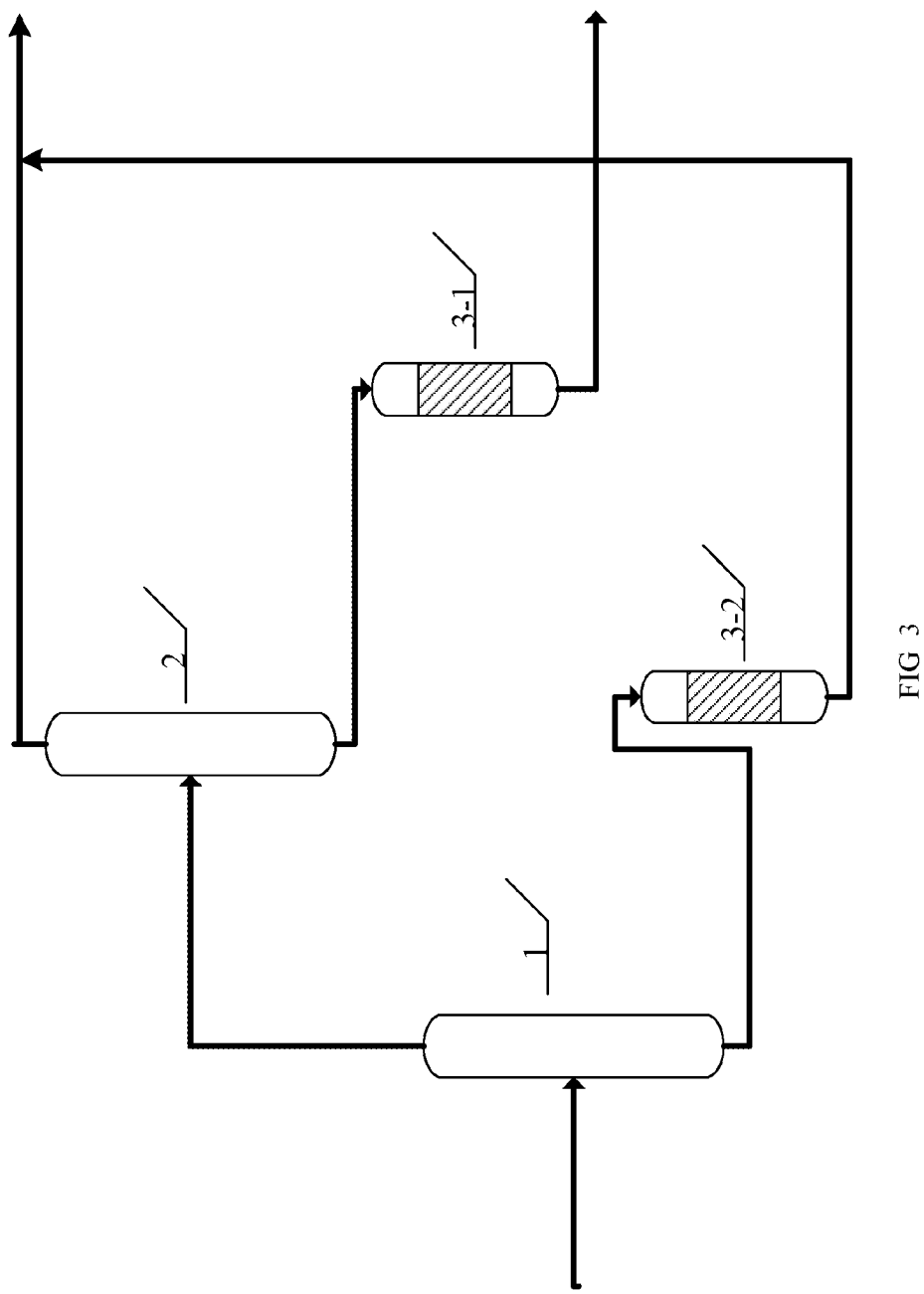
FIG. 3 is a flow diagram of embodiment 4.

FIG. 3 is the flow diagram of embodiment 4, which comprises the following steps of extracting and separating stabilized gasoline (catalytic gasoline) with a distillation range of 30-205 DEG C., a sulphur content of 100 ppm, a mercaptan sulphur content of 5 ppm, an olefine content of 30 percent (v), an alkadiene content of 0.1 percent (v), an aromatic hydrocarbon content of 15 percent (v), an octane number (RON) of 89 and a density of 728 kilograms/$m^3$ in an extraction tower 1 by the flow capacity of 60,000 tons/annual to extract extract oil and raffinate oil; ensuring that the solvents in the extraction tower 1 are sulfolane with an extraction temperature of 120 DEG C., a solvent ratio (solvent/feeding) of 3.5 (mass), a raffinate oil washing ratio of 0.2 (mass), a solvent recovery temperature of 165 DEG C. and a solvent recovery pressure of 0.1 MPa (absolute pressure); cutting and fractionating the raffinate oil extracted by the extraction tower 1 in a distillation tower 2 by the flow capacity of 49.200 tons/annual, wherein the distillation tower 2 has a tower top temperature of 77 DEG C., a tower bottom temperature of 173 DEG C., a tower top pressure of 0.15 MPa (absolute pressure) and a tower bottom pressure of 0.20 MPa (absolute pressure) to respectively obtain light gasoline and heavy gasoline; distilling the light oil with a distillation range of 30-110 DEG C. through the upper part of the distillation tower 2 and recovering the light oil as blended gasoline by the flow capacity of 22,100 tons/annual; hydrotreating the heavy gasoline with a distillation range of 110-170 DEG C. in a heavy gasoline hydrogenation device 3-1 by the flow capacity of 27,100 tons/annual, wherein the catalysts in the heavy gasoline hydrogenation device 3-1 are hydrogenation catalysts GHT-22, and the heavy gasoline hydrogenation device 3-1 has a volume airspeed ratio of 4.0 $h^{-1}$, a hydrogen/oil volume ratio of 500, an operating temperature of 320 DEG C. and an operating pressure of 4.0 MPa (absolute pressure); hydrotreating the extract oil extracted by the extraction tower 1 in a hydrogenation device 3-2 by the flow capacity of 10,800 tons/annual, wherein the catalysts in the hydrogenation device 3-2 are hydrogenation catalysts GHT-22, and the hydrogenation device 3-2 has a volume airspeed ratio of 4.0 $h^{-1}$, a hydrogen/oil volume ratio of 500, an operating temperature of 290 DEG C. and an operating pressure of 4.0 MPa (absolute pressure); and recovering the hydrogenated extract oil after being mixed with the light gasoline as blended gasoline by the flow capacity of 10,800 tons/annual.

The obtained blended gasoline has a distillation range of 30-205 DEG C., a sulphur content of 12.3 ppm, a mercaptan sulphur content of lower than 1.0 ppm (The trace contained is capable of being detected), an olefine content of 24.3 percent (v), an alkadiene content of 0.01 percent (v) (The trace contained is capable of being detected), an aromatic hydrocarbon content of 24.3 percent (v), an octane number (RON) of 94.8, a density of 727.5 kilograms/$m^3$, an overall recovery of 32,900 tons/annual.

The obtained high-quality ethylene feed or reformate has a distillation of 110-205 DEG C., a trace contained in the sulphur content incapable of being detected, a mercaptan sulphur content of lower than 1.0 ppm (The trace contained is capable of being detected), a trace contained in the olefine content incapable of being detected, a bromine index (bromine number) of 39 (0.039), an aromatic hydrocarbon content of 3.7 percent (v), an octane number (RON) of 75.0, a density of 728.7 kilograms/$m^3$, an overall recovery of 27,100 tons/annual.

The all the hydrogenation catalysts GHT-22 contained in the hydrogenation device and the used test method thereof are the same as the embodiment 1.

Embodiment 5

FIG. 4 is the flow diagram of embodiment 5, which comprises the following steps of extracting and separating stabilized gasoline (catalytic gasoline) with a distillation range of 30-205 DEG C., a sulphur content of 100 ppm, a mercaptan sulphur content of 5 ppm, an olefine content of 30 percent (v), an alkadiene content of 0.1 percent (v), an aromatic hydrocarbon content of 15 percent (v), an octane number (RON) of 89 and a density of 728 kilograms/m³ in an extraction tower 1 by the flow capacity of 60,000 tons/annual; simultaneously extracting and separating naphtha with a distillation range of 30-205 DEG C., a sulphur content of 200 ppm, a mercaptan sulphur content of 1 ppm, an olefine content of lower than 0.1 percent (v) (The trace contained is capable of being detected), an alkadiene content of lower than 0.01 percent (v) (The trace contained is capable of being detected), an aromatic hydrocarbon content of 8 percent (v), an octane number (RON) of 82 and a density of 732 kilograms/m³ in the extraction tower 1 by the flow capacity of 20,000 tons/annual; meanwhile, extracting and separating hydrotreated coker gasoline with a distillation range of 30-205 DEG C., a sulphur content of 150 ppm, a mercaptan sulphur content of 1 ppm, an olefine content of 6 percent (v), an alkadiene content of lower than 0.01 percent (v) (The trace contained is capable of being detected), an aromatic hydrocarbon content of 10 percent (v), an octane number (RON) of 79 and a density of 721 kilograms/m³ in the extraction tower 1 by the flow capacity of 20,000 tons/annual to extract extract oil and raffinate oil; ensuring that the solvents used in the extraction tower 1 are N-Methyl-Pyrrolidone with an extraction temperature of 130 DEG C., a solvent ratio (solvent/feeding) of 2.5 (mass), a raffinate oil washing ratio of 0.25 (mass), a solvent recovery temperature of 177 DEG C. and a solvent recovery pressure of 0.15 MPa (absolute pressure); cutting and fractionating the raffinate oil extracted by the extraction tower 1 in a distillation tower 2 by the flow capacity of 85,000 tons/annual to respectively obtain light gasoline and heavy gasoline, wherein the distillation tower 2 has a tower top temperature of 87 DEG C., a tower bottom temperature of 187 DEG C., a tower top pressure of 0.20 MPa (absolute pressure) and a tower bottom pressure of 0.25 MPa (absolute pressure); distilling the light oil with a distillation range of 30-110 DEG C. through the upper part of the distillation tower 2 and recovering the light oil as blended gasoline by the flow capacity of 37,400 tons/annual; hydrotreating the heavy gasoline with a distillation range of 110-170 DEG C. in a heavy gasoline hydrogenation device 3-1 by the flow capacity of 47,600 tons/annual, wherein the catalysts in the heavy gasoline hydrogenation device 3-1 are hydrogenation catalysts GHT-22, and the heavy gasoline hydrogenation device 3-1 has a volume airspeed ratio of 1.0 h⁻¹, a hydrogen/oil volume ratio of 250, an operating temperature of 250 DEG C. and an operating pressure of 1.0 MPa (absolute pressure); recovering the hydrogenated heavy gasoline as high-quality ethylene feed or catalytic reforming feedstock by the flow capacity of 47,600 tons/annual; hydrotreating the extract oil extracted by the extraction tower 1 in an extract oil hydrogenation device 3-2 by the flow capacity of 15,000 tons/annual, wherein the catalysts in the extract oil hydrogenation device 3-2 are hydrogenation catalysts GHT-22, the extract oil hydrogenation device 3-2 has a volume airspeed ratio of 1.0 h⁻¹, a hydrogen/oil volume ratio of 250, an operating temperature of 250 DEG C. and an operating pressure of 1.0 MPa (absolute pressure); and recovering the hydrogenated extract oil after being mixed with the light gasoline as blended gasoline by the flow capacity of 15,000 tons/annual.

The obtained blended gasoline has a distillation range of 30-205 DEG C., a sulphur content of 24.0 ppm, a mercaptan sulphur content of lower than 1.0 ppm (The trace contained is capable of being detected), an olefine content of 16.4 percent (v), an alkadiene content of 0.01 percent (v) (The trace contained is capable of being detected), an aromatic hydrocarbon content of 22.3 percent (v), an octane number (RON) of 93.1, a density of 722.9 kilograms/m³, an overall recovery of 52,400 tons/annual.

The obtained high-quality ethylene feed or the reformate has a distillation of 110-205 DEG C., a sulphur content of 4.7 ppm, a mercaptan sulphur content of lower than 1.0 ppm (The trace contained is capable of being detected), a trace contained in the olefine content incapable of being detected, a bromine index (bromine number) of 32 (0.032), an aromatic hydrocarbon content of 1.8 percent (v), an octane number (RON) of 73.9, a density of 732.4 kilograms/m³, an overall recovery of 47,600 tons/annual.

The all hydrogenation catalysts GHT-22 contained in hydrogenation device and the used test method thereof are the same as the embodiment 1.

Embodiment 6

The flow diagram of embodiment 6 is the same as the embodiment 5, which comprises the following steps of extracting and separating stabilized gasoline (catalytic gasoline) with a distillation range of 30-205 DEG C., a sulphur content of 800 ppm, a mercaptan sulphur content of 9 ppm, an olefine content of 36 percent (v), an alkadiene content of 0.9 percent (v), an aromatic hydrocarbon content of 17 percent (v), an octane number (RON) of 91 and a density of 731 kilograms/m³ in an extraction tower 1 by the flow capacity of 60,000 tons/annual; simultaneously extracting and separating naphtha with a distillation range of 30-205 DEG C., a sulphur content of 200 ppm, a mercaptan sulphur content of 1 ppm, an olefine content of lower than 0.1 percent (v) (The trace contained is capable of being detected), an alkadiene content of lower than 0.01 percent (v) (The trace contained is capable of being detected), an aromatic hydrocarbon content of 8 percent (v), an octane number (RON) of 82 and a density of 732 kilograms/m³ in the extraction tower 1 by the flow capacity of 20,000 tons/annual; meanwhile, extracting and separating hydrotreated coker gasoline with a distillation range of 30-205 DEG C., a sulphur content of 150 ppm, a mercaptan sulphur content of 1 ppm, an olefine content of 6 percent (v), an alkadiene content of lower than 0.01 percent (v) (The trace contained is capable of being detected), an aromatic hydrocarbon content of 10 percent (v), an octane number (RON) of 79 and a density of 721 kilograms/m³ in the extraction tower 1 by the flow capacity of 20,000 tons/annual to extract extract oil and raffinate oil; ensuring that the solvents used in the extraction tower 1 are N-formyl-morpholine with an extraction temperature of 150 DEG C., a solvent ratio (solvent/feeding) of 6.0 (mass), a raffinate oil washing ratio of 0.3 (mass), a solvent recovery temperature of 185 DEG C. and a solvent recovery pressure of 0.2 MPa (absolute pressure); cutting and fractionating the raffinate oil extracted by the extraction tower 1 in a distillation tower 2 by the flow capacity of 84,000 tons/annual to respectively obtain light gasoline and heavy gasoline, wherein the distillation tower 2 has a tower top temperature of 95 DEG C., a tower bottom temperature of 194 DEG C., a tower top pressure of 0.25 MPa (absolute pressure) and a tower bottom pressure of 0.3 MPa (absolute pressure); distilling the light oil with a distillation range of 30-110 DEG C. through the upper part of the distillation tower 2 and recovering the light oil as blended gasoline by the flow capacity of 38,600 tons/annual; hydrotreating the heavy gasoline with a distillation range of 110-205 DEG C. in a heavy gasoline hydrogenation device 3-1 by the flow capacity of 45,400 tons/annual, wherein the catalysts in the heavy gasoline hydrogenation device 3-1 are hydrogenation catalysts GHT-22, and the heavy gasoline hydrogenation device 3-1 has a volume airspeed ratio of 2.5 h$^{-1}$, a hydrogen/oil volume ratio of 300, an operating temperature of 285 DEG C. and an operating pressure of 2.5 MPa (absolute pressure); recovering the hydrogenated heavy gasoline as high-quality ethylene feed or catalytic reforming feedstock by the flow capacity of 45,400 tons/annual; hydrotreating the extract oil extracted by the extraction tower 1 in an extract oil hydrogenation device 3-2 by the flow capacity of 16,000 tons/annual, wherein the catalysts in the extract oil hydrogenation device 3-2 are hydrogenation catalysts GHT-22, the extract oil hydrogenation device 3-2 has a volume airspeed ratio of 2.5 h$^{-1}$, a hydrogen/oil volume ratio of 300, an operating temperature of 270 DEG C. and an operating pressure of 2.5 MPa (absolute pressure); recovering the hydrogenated extract oil after being mixed with the light gasoline as blended gasoline by the flow capacity of 16,000 tons/annual.

The obtained blended gasoline has a distillation range of 30-205 DEG C., a sulphur content of 38.1 ppm, a mercaptan sulphur content of lower than 1.0 ppm (The trace contained is capable of being detected), an olefine content of 20.3 percent (v), an alkadiene content of 0.01 percent (v) (The trace contained is capable of being detected), an aromatic hydrocarbon content of 20.9 percent (v), an octane number (RON) of 93.7, a density of 721.3 kilograms/m$^3$ and an overall recovery of 54,600 tons/annual.

The obtained high-quality ethylene feed or reformate has a distillation of 110-205 DEG C., a sulphur content of 4.0 ppm, a mercaptan sulphur content of lower than 1.0 ppm (The trace contained is capable of being detected), an olefine content of 2.0 percent (v), a bromine index (bromine number) of 25 (0.025), a trace contained in aromatic hydrocarbon content incapability of being detected, an octane number (RON) of 74.8, a density of 738.9 kilograms/m$^3$ and an overall recovery of 45,400 tons/annual.

The all the hydrogenation catalysts GHT-22 contained in the hydrogenation device and the used test method thereof are the same as the embodiment 1.

INDUSTRIAL APPLICATION

The system and the method thereof can remove olefin, mercaptan sulphur and diene; the hydrogenation device in the invention has small scale and low cost; and finally, various feedstock like stabilized gasoline and mixtures of naphtha and hydrogenated coker gasoline can be treated by the invention. The invention organically combines extraction, distillation cut and hydrotreatment, so that the high-quality ethylene feed is optimized, the extract oil in the blended gasoline is increased, and the octane number is improved.

The invention claimed is:

1. A system for preparing high-quality gasoline and diesel oil through component oil refining hydrocarbon recombination hydrogenation, characterized by comprising an extraction system, a distillation system and a hydrogenation device, wherein the upper part of the extraction system is connected with the distillation system through a pipeline, and the lower part of the extraction system is connected with the hydrogenation device through the pipeline; the hydrogenation device is connected with the pipeline at the upper part of the distillation system through the pipeline; products are directly recovered by the upper part of the extraction system through the pipeline; the middle part of the distillation system is connected with another hydrogenation device through the pipeline; and products are directly recovered by the lower part of the distillation system through the pipeline.

2. A method for preparing high-quality gasoline and diesel oil through component oil refining hydrocarbon recombination hydrogenation, which comprises the following steps of extracting and separating feedstock in an extraction system to extract raffinate oil and extract oil; cutting and fractionating the raffinate oil extracted by the extraction system in a distillation system, distilling light gasoline through the upper part of the distillation system and recovering the light gasoline as blended gasoline; extracting chemical light oil through a lateral line at the middle part of the distillation system; hydrotreating the chemical light oil in a chemical light oil hydrogenation device; recovering the hydrogenated chemical light oil as high-quality ethylene feed or catalytic reforming feedstock; hydrotreating the extract oil extracted by the extraction system in an extract oil hydrogenation device; recovering the hydrogenated extract oil after being mixed with the light gasoline as blended gasoline; and directly recovering diesel oil after being cut by the distillation system.

3. A method for preparing high-quality gasoline and diesel oil through component oil refining hydrocarbon recombination hydrogenation according to claim 2, characterized in that:
said distillation system is a distillation tower with a tower top temperature of 77-95 DEG C, a tower bottom temperature of 173-194 DEG C, a tower top pressure of 0.15-0.25 MPa (absolute pressure) and a tower bottom pressure of 0.20-0.30 MPa (absolute pressure); and the distillation range of light gasoline is controlled within 30-110 DEG C, the distillation range of chemical light oil is 110-160 DEG C, and the distillation range of diesel oil is 160-205 DEG C.

4. A method for preparing high-quality gasoline and diesel oil through component oil refining hydrocarbon recombination hydrogenation according to claim 3, characterized in that:
said distillation system is a distillation tower with a tower top temperature of 87 DEG C, a tower bottom temperature of 184 DEG C, a tower top pressure of 0.2 MPa (absolute pressure) and a tower bottom pressure of 0.25 MPa (absolute pressure).

5. A method for preparing high-quality gasoline and diesel oil through component oil refining hydrocarbon recombination hydrogenation according to claim 4, characterized in that:
said solvents used in the extraction system are sulfolane with an extraction temperature of 120 DEG C, a solvent ratio (solvent/feeding) of 3.5 (mass), a raffinate oil washing ratio of 0.2 (mass), a solvent recovery temperature of 165 DEG C and a solvent recovery pressure of 0.1 MPa (absolute pressure).

6. A method for preparing high-quality gasoline and diesel oil through component oil refining hydrocarbon recombination hydrogenation according to claim 5, characterized in that:
all the catalysts in said chemical light oil hydrogenation device are hydrogenation catalysts GHT-22; and the chemical light oil hydrogenation device has a volume airspeed ratio of 1-4 h$^{-1}$, a hydrogen/oil volume ratio of 250-500, an operating temperature of 250-320 DEG C and an operating pressure of 1-4 MPa (absolute pressure); and the extract oil hydrogenation device has a volume airspeed ratio of 1-4 h$^{-1}$, a hydrogen/oil volume ratio of 250-500, an operating temperature of 250-320 DEG C and an operating pressure of 1-4 MPa (absolute pressure).

7. A method for preparing high-quality gasoline and diesel oil through component oil refining hydrocarbon recombination hydrogenation according to claim 6, characterized in that:
said chemical light oil hydrogenation device has a volume airspeed ratio of 2.5 h$^{-1}$, a hydrogen/oil volume ratio of 300, an operating temperature of 285 DEG C and an operating pressure of 2.5 MPa (absolute pressure); and said extract oil hydrogenation device has a volume airspeed ratio of 2.5 h$^{-1}$, a hydrogen/oil volume ratio of 300, an operating temperature of 285 DEG C and an operating pressure of 2.5 MPa (absolute pressure).

8. A method for preparing high-quality gasoline and diesel oil through component oil refining hydrocarbon recombination hydrogenation according to claim 7, characterized in that:
the physical and chemical properties of all the hydrogenation catalysts in said chemical light oil hydrogenation device and the extract oil hydrogenation device are shown as follows:

| Names of index | Unit | GHT-22 |
| --- | --- | --- |
| Appearance | — | Grey three-leaf shape |
| Specification | mm | Φ1.5-2.0 |
| Intensity | N/cm | 180 |
| Bulk density | g/ml | 0.73 |
| Specific surface area | M$^2$/g | 180 |
| Pore volume | ml/g | 0.5-0.6 |
| WO$_3$ | M % | 15 |
| NiO | M % | 1.7 |
| C$_o$O | M % | 0.15 |
| Na$_2$O | M % | <0.09 |
| Fe$_2$O$_3$ | M % | <0.06 |
| SiO$_2$ | M % | <0.60 |
| Carrier | M % | 82.4. |

9. A method for preparing high-quality gasoline and diesel oil through component oil refining hydrocarbon recombination hydrogenation according to claim 4, characterized in that:
the solvents used in said extraction system is N-Methyl-Pyrrolidone with an extraction temperature of 130 DEG C, a solvent ratio (solvent/feeding) of 2.5 (mass), a raffinate oil washing ratio of 0.25 (mass), a solvent recovery temperature of 177 DEG C and a solvent recovery pressure of 0.15 MPa (absolute pressure).

10. A method for preparing high-quality gasoline and diesel oil through component oil refining hydrocarbon recombination hydrogenation according to claim 9, characterized in that:
the solvents used in said extraction system is N-formyl-morpholine with an extraction temperature of 150 DEG C, a solvent ratio (solvent/feeding) of 6 (mass), a raffinate oil washing ratio of 0.3 (mass), a solvent recovery temperature of 185 DEG C and a solvent recovery pressure of 0.2 MPa (absolute pressure).

11. A system for preparing high-quality gasoline through component oil refining hydrocarbon recombination hydrogenation, characterized by comprising an extraction system, a distillation system and a hydrogenation device, wherein the upper part of the extraction system is connected with the distillation system through a pipeline, and the lower part of the extraction system is connected with the extract oil hydrogenation device through the pipeline; light gasoline is recovered by the upper part of the distillation system through the pipeline; the lower part of the distillation system is connected with a heavy gasoline hydrogenation device through the pipeline; and catalytic reforming feedstock or ethylene feed are recovered by the lower part of the heavy gasoline hydrogenation device through the pipeline.

12. A method for preparing high-quality gasoline through component oil refining hydrocarbon recombination hydrogenation, which comprises the following steps of extracting and separating feedstock in an extraction system to extract raffinate oil and extract oil; cutting and fractionating the raffinate oil extracted by the extraction system in a distillation system, distilling light gasoline through the upper part of the distillation system and recovering the light gasoline as blended gasoline; extracting heavy gasoline through the lower part of the distillation system and hydrotreating the heavy gasoline in a heavy gasoline hydrogenation device; recovering the hydrogenated heavy gasoline as high-quality ethylene feed or catalytic reforming feedstock; hydrotreating the extract oil extracted by the extraction system in an extract oil hydrogenation device; and recovering the hydrogenated extract oil after being mixed with the light gasoline as blended gasoline.

13. A method for preparing high-quality gasoline through component oil refining hydrocarbon recombination hydrogenation according to claim 12, characterized in that:
said distillation system is a distillation tower with a tower top temperature of 77-95 DEG C, a tower bottom temperature of 173-194 DEG C, a tower top pressure of 0.15-0.25 MPa (absolute pressure) and a tower bottom pressure of 0.20-0.30 MPa (absolute pressure); and the distillation range of light gasoline is controlled within 30-110 DEG C, the distillation range of heavy gasoline is 110-170 DEG C.

14. A method for preparing high-quality gasoline through component oil refining hydrocarbon recombination hydrogenation according to claim 13, characterized in that:
said distillation system is a distillation tower with a tower top temperature of 87 DEG C, a tower bottom temperature of 187 DEG C, a tower top pressure of 0.20 MPa (absolute pressure) and a tower bottom pressure of 0.25 MPa (absolute pressure).

15. A method for preparing high-quality gasoline through component oil refining hydrocarbon recombination hydrogenation according to claim 14, characterized in that:
the solvents in said extraction system are sulfolane with an extraction temperature of 120 DEG C, a solvent ratio (solvent/feeding) of 3.5 (mass), a raffinate oil washing ratio of 0.2 (mass), a solvent recovery temperature of 165 DEG C and a solvent recovery pressure of 0.1 MPa (absolute pressure).

16. A method for preparing high-quality gasoline through component oil refining hydrocarbon recombination hydrogenation according to claim 15, characterized in that:
all the catalysts in said heavy gasoline hydrogenation device and said extract oil hydrogenation device are hydrogenation catalysts GHT-22; and the two devices respectively have a volume airspeed ratio of 1.0-4.0 h$^{-1}$, a hydrogen/oil volume ratio of 250-500, an operating temperature of 250-320 DEG C and an operating pressure of 1.0-4.0 MPa (absolute pressure).

17. A method for preparing high-quality gasoline through component oil refining hydrocarbon recombination hydrogenation according to claim 16, characterized in that:
said heavy gasoline hydrogenation device has a volume airspeed ratio of 2.5 h$^{-1}$, a hydrogen/oil volume ratio of 300, an operating temperature of 270 DEG C and an operating pressure of 2.50 MPa (absolute pressure); and said extract oil hydrogenation device has a volume airspeed ratio of 2.5 h$^{-1}$, a hydrogen/oil volume ratio of 300, an operating temperature of 285 DEG C and an operating pressure of 2.50 MPa (absolute pressure).

18. A method for preparing high-quality gasoline through component oil refining hydrocarbon recombination hydrogenation according to claim 17, characterized in that:

the physical and chemical properties of all the hydrogenation catalysts GHT-22 in said heavy gasoline hydrogenation device and said extract oil hydrogenation device are shown as follows:

| Names of index | Unit | GHT-22 |
|---|---|---|
| Appearance | — | Grey three-leaf shape |
| Specification | mm | Φ1.5-2.0 |
| Intensity | N/cm | 180 |
| Bulk density | g/ml | 0.73 |
| Specific surface area | $M^2/g$ | 180 |
| Pore volume | ml/g | 0.5-0.6 |
| $WO_3$ | M % | 15 |
| NiO | M % | 1.7 |
| $C_oO$ | M % | 0.15 |
| $Na_2O$ | M % | <0.09 |
| $Fe_2O_3$ | M % | <0.06 |
| $SiO_2$ | M % | <0.60 |
| Carrier | M % | 82.4. |

19. A method for preparing high-quality gasoline through component oil refining hydrocarbon recombination hydrogenation according to claim 14, characterized in that:

the solvents in said extraction system are N-Methyl-Pyrolidone with an extraction temperature of 130 DEG C, a solvent ratio (solvent/feeding) of 2.5 (mass), a raffinate oil washing ratio of 0.25 (mass), a solvent recovery temperature of 177 DEG C and a solvent recovery pressure of 0.15 MPa (absolute pressure).

20. A method for preparing high-quality gasoline through component oil refining hydrocarbon recombination hydrogenation according to claim 14, characterized in that:

the solvents in said extraction system are N-formyl-morpholine with an extraction temperature of 150 DEG C, a solvent ratio (solvent/feeding) of 6.0 (mass), a raffinate oil washing ratio of 0.3 (mass), a solvent recovery temperature of 185 DEG C and a solvent recovery pressure of 0.2 MPa (absolute pressure).

* * * * *